United States Patent [19]
Bennett

[11] Patent Number: 5,550,875
[45] Date of Patent: Aug. 27, 1996

[54] APPARATUS AND METHOD FOR RESIDUAL ERROR CLOCK SKEW BOUND, AND CLOCKING THEREWITH

[75] Inventor: Donald B. Bennett, Apple Valley, Minn.

[73] Assignee: Unisys Corporation, Blue Bell, Pa.

[21] Appl. No.: 366,201

[22] Filed: Dec. 29, 1994

[51] Int. Cl.$^6$ .................................................. H04L 7/00
[52] U.S. Cl. ........................................ 375/356; 370/100.1
[58] Field of Search ............................. 370/100.1, 108, 370/105; 371/1; 375/356, 371, 214, 215; 327/141, 165, 153, 167; 455/51.1

[56] References Cited

U.S. PATENT DOCUMENTS

| | | | |
|---|---|---|---|
| 4,142,069 | 2/1979 | Stover | 375/356 |
| 5,051,990 | 9/1991 | Kato | 375/356 |
| 5,117,424 | 5/1992 | Cohen et al. | 375/356 |
| 5,163,068 | 11/1992 | El-Amawy | 375/356 |
| 5,406,559 | 4/1995 | Edem et al. | 370/108 |
| 5,432,823 | 7/1995 | Gasbarro et al. | 375/356 |

*Primary Examiner*—Tesfaldet Bocure
*Attorney, Agent, or Firm*—John B. Sowell; Mark T. Starr; Thomas J. Scott

[57] ABSTRACT

Multiple clocks are interconnected in a network which is fed and controlled by a clock generator. A delay of one or more clock periods less a fixed amount is imposed between any two such clocks excluding the clock generator, to cause the repeated clock so transferred to occur at the appropriate time in the next cycle. Feedback using such delays assures bounded phase differences among these clocks. Thus, skew bounds can be provided for large numbers of clocks, to provide a bounded delay among multiple clocks. There is inserted in each link between a pair of clock nodes a delay line that delays a propogating clock signal by just enough time to cause the repeated clock to occur at the appropriate time in the next cycle, thereby synchronizing the appearance of that clock signal at the various nodes. Self-oscillation of the system, if the clock generator is removed, is avoided by having the delay between any two directly connected nodes be greater than one period of that clock generator.

6 Claims, 14 Drawing Sheets

○ CLOCK NODE
● DATA CELL

APPARATUS AND METHOD FOR RESIDUAL ERROR CLOCK SKEW BOUND, AND CLOCKING THEREWITH

FIELD OF THE INVENTION

The present invention relates to electrical communications, and more particularly to synchronization of same. The present invention also relates to communications such as pulse or digital communications, and more particularly to synchronizers for network synchronizing with more than one station, as well as to phase displacement, slip or jitter correction for synchronizers. The present invention also relates to skew bound in synchronous computing structures, and more particularly to arbitrarily large computing structures with a constant skew bound. The present invention further relates to distributed digital systems and more particularly to improved facilities for controlling the timing between the nodes of a distributed digital system. The present invention still further relates to digital computer systems and more particularly to a synchronous digital computer system in which data is transmitted between state devices or subsystems. The present invention further relates to timing or clock circuitry and more particularly to a digital network for reducing or eliminating clock latency created in a system by an internal clock generator, and thereby reducing clock skew between individual independently clocked portions of a multiple unit system.

BACKGROUND OF THE INVENTION

To maintain the efficient use of time in high speed electronic circuitry, it is essential to provide clocking signals that are accurately related to each other in time. As the number of components in such a system increases, the number of clock logic components needed for that system also increases, so that accurate clocking becomes more difficult due to the additive effect of clock logic time variations. To deal with this problem, most present designs utilize a balanced tree or other carefully controlled interconnection pattern. However, the variability of timing across these patterns inevitably increases indefinitely with the size of the system.

One approach to this problem is proposed in U.S. Pat. No. 5,163,068 issued Nov. 10, 1992 for "Arbitrarily Large Clock Networks with Constant Skew Bound" by Ahmed El-Amawy, which patent is hereby incorporated by reference herein. In the El-Amawy patent, global synchronization of an arbitrarily large computing structure is sought such that the clock skew between any two communicating cells of that structure would be bounded by a constant, regardless of the size of the computing structure. El-Amawy proposes using clock nodes to perform simple processing on clock signals. Each such clock signal would be processed in a manner similar to that in which data signals would be processed by that system. A cyclic network of the clock nodes, within certain topological constraints, along with timing constraints on the function of the clock nodes, is proposed to maintain a constant bound on the clock skew between those nodes. The inputs to each clock node would be combined to produce a single output signal, which in turn would then be sent to data-processing cells associated with that node and to neighboring clock nodes. The first arriving input from a given clocking event would trigger that node's action, resulting in an output pulse. Further information about the El-Amawy approach is described in Ahmed El-Amawy, "Clocking Arbitrarily Large Computing Structures Under Constant Skew Bound" in *IEEE Transactions on Parallel and Distributed Systems*, Vol. 4, No. 3, March 1993, pages 241-255, which is hereby incorporated herein by reference.

The El-Amawy patent asserts that only the directly interconnected portions of a clock system need be controlled in time, and proposes a clocking approach that was intended to allow a constant time bound to be maintained across all such portions. However, in high speed logic, the clocks must be more accurately timed than El-Amawy's approach can provide, because the El-Amawy approach is limited by the distance between the interconnected parts and by the delays through the logic parts employed.

The El-Amawy patent provides a clocking system whose clock time-skew bound will fall within a certain tolerance. In other words, there will be a plurality of clocks whose respective phases will fall within a certain tolerance (in nanoseconds) of each other. That tolerance is at least $2\Delta$, where $\Delta$ is the sum of the maximum signal delays through one wire connection and one set of clock logic for his clocking system. These delays must be large enough to provide for intrinsic logic delays and signal propagation at the speed of light. However, because these delays must be so large, the accuracy of the El-Amawy approach is limited by this delay. In systems that use fast clocks, this delay is a significant portion of the clock period, causing a corresponding loss of available logic computation time. The El-Amawy patent also shows how to reduce the total amount of clock logic needed by increasing the multiple of $\Delta$ and, consequently, increasing the clock skew.

In systems having large numbers of synchronized clocks, clock fanout logic permits errors between clocks to grow without bound as system size increases. The El-Amawy patent reduces such errors but allows too large a skew bound between clock circuits. If phase locked loops were instead used to control clock skew, they would introduce undesirable coupled oscillation behavior that would be hard to control.

El-Amawy states that he provides a bounded skew, such that no connected components suffer clock skew greater than $n\Delta$, where the number of nodes n is greater than 1, and $\Delta$ is the sum of the worst case node and link propagation delays. Although bounded skew is quite desirable, the El-Amawy value for skew is much too large. Addition of phase locked loops to attempt to control skew may not work, but would introduce further problems. Phase locked loops have substantial costs in terms of their power requirements and chip area requirements, and furthermore have at least questionable stability in a scalable environment.

SUMMARY OF THE INVENTION

Accordingly, an object of the present invention is to provide apparatus and method for providing accurate clock signals for a large amount of, or an arbitrarily large set of, digital logic.

Another object of the present invention is to provide apparatus and method that reduces the skew between physically separate clocks.

A further object of the present invention is to provide apparatus and method that bounds errors between clocks while also bounding clock skew between circuits of a system.

Still another object of the present invention is to provide apparatus and method for synchronizing multiple clocks and data paths.

A still further object of the present invention is to provide apparatus and method for aligning different cycles of multiple clocks.

Yet another object of the present invention is to provide apparatus and method for bounding clock delays in systems having a plurality (e.g. large numbers) of clocks.

Still another object of the present invention is to provide a clocking scheme that can reduce the bounded skew to an arbitrarily small value.

A still further object of the present invention is to provide an upper bound for clock skew that is a reasonable fraction of the propagation delay.

Briefly, these and other objects of the present invention are accomplished by inserting in each clock line a delay line that is used to delay a propagating clock signal by just enough time to cause the repeated clock to occur at the appropriate time in the next cycle. For a clock line that is continually oscillating with period p, a delay of $m\pm\epsilon$ seconds is inserted in each clock line of the system, so that the driven clock logic emits a pulse at time $p+2(\delta+\epsilon)$, where $\delta$ and $\epsilon$ are tolerances in component values that can be made arbitrarily small in principle. There is then no practical difference between a signal transition at time t and a signal transition at time t+p. Thus, the clock skew may be thereby reduced below $2\Delta$, so that a bounded skew is made practical even for faster logic. The total amount of clock logic needed is reduced by increasing the skew by multiples of $\delta+\epsilon$ rather than by multiples of $\Delta$ (a larger value).

Different cycles of a steadily oscillating clock signal should be identical. Thus, a steadily oscillating clock signal is the same regardless of which particular clock cycle is inspected. The present invention therefore can improve the El-Amawy circuit by delaying the clock signals in that circuit by one or more clock periods minus the inherent delay that is the limitation in that circuit, so that the arrival of a clock (e.g. clock pulse or edge) coincides with the arrival of the next clock at the driving circuit. The clocks are therefore made indistinguishable in time and are limited in error by component tolerance errors rather than El-Amawy's speed-of-propagation delays. Component tolerance errors can in principle be arbitrarily reduced. Moreover, the achievement of small errors in individual components is not compromised by the cumulative effects of many components.

In the present invention, a number of at least substantially identical parallel delays are inserted in the system, of a preset value, to get the clocks' respective phases to align with each other more accurately; each of the nodes' inputs gets delayed by one clock cycle, so that the clocks' outputs are all in phase.

Other objects, advantages and novel features of the invention will become apparent from the following detailed description of the invention when considered in conjunction with the accompanying drawings.

DETAILED DESCRIPTION OF THE PREFERRED EMBODIMENTS

Figure 1:
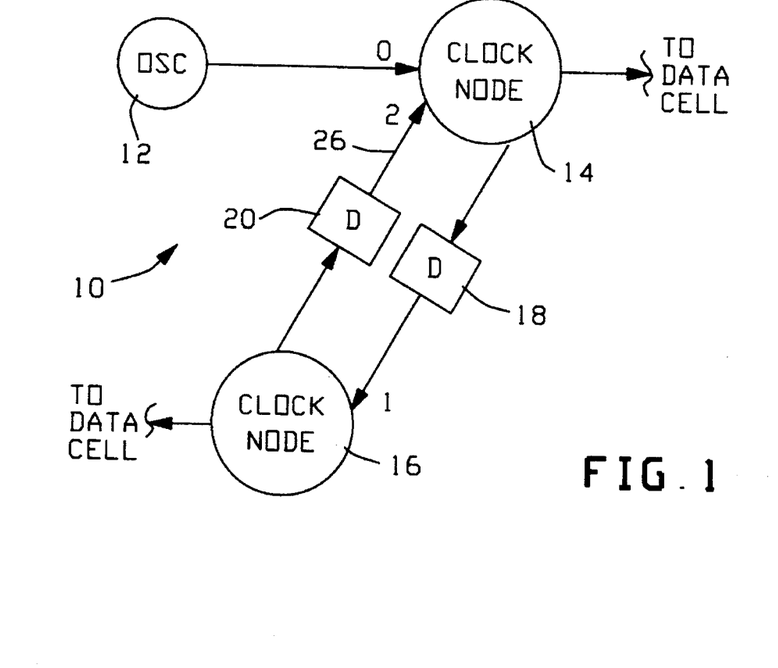
FIG. 1 shows one embodiment of a clocking arrangement according to the present invention.

Referring now to the drawings, wherein like reference characters designate like or corresponding parts throughout the several views, FIG. 1 shows a preferred implementation of a zero-skew clock 10. In the basic clock circuit of FIG. 1, an oscillator clock 12 drives a pair of nodes 14 and 16 that have line delays 18 and 20 (m +$\epsilon$) inserted in their respective output clock paths. The delay times values for delays 18 and 20 are chosen such that each node 14 and 16 repeats the clock signal one (or more) clock period(s) later than its input clock signal. The clock signals can thereby be arranged to occur in coincidence with a clock $p_x$ which in effect occurs at the same time from the point of view of data circuitry that would not remember or would have no knowledge of the initialization process or clock cycle.

In the present invention, there is inserted in each clock line a delay line that is used to delay a propagating clock signal by just enough time to cause the repeated clock to occur at the appropriate time $p_x$ in the next cycle. Preferably, in each clock line of the system, a delay of $m\pm\epsilon$ nano seconds is inserted, so that the driven clock logic emits a pulse at time $p+2(\delta+\epsilon)$, where $\delta$ and $\epsilon$ are tolerances in component values that can be made arbitrarily small relative to a clock cycle or delays g and m in principle. Thus, for a clock line that is continually oscillating with period p, there is essentially no practical difference between a signal transition at time t and a subsequent signal transition at time t+p. Thus, the clock skew may be thereby reduced below $2\Delta$ so that a bounded skew is made very small even for faster logic. The total amount of clock logic needed is reduced by increasing the skew by multiples of $\delta+\epsilon$ rather than by multiples of $\Delta$ (a larger value).

Different cycles of a steadily oscillating clock signal should be identical. Thus, a steadily oscillating clock signal is the same regardless of which particular clock cycle is inspected. The present invention therefore can improve the El-Amawy circuit by delaying the clock signals in that circuit by one or more clock periods minus the inherent delay that is the limitation in that circuit, so that the arrival of a clock (e.g. a clock pulse) coincides with the arrival of the next clock at the driving circuit. The clocks are therefore made indistinguishable in time and are limited in error by component tolerance errors rather than El-Amawy's speed-of-propagation delays. Component tolerance errors can in principle be arbitrarily reduced. Moreover, the achievement of small errors in individual components is not compromised by the cumulative effects of many components.

Figure 2:
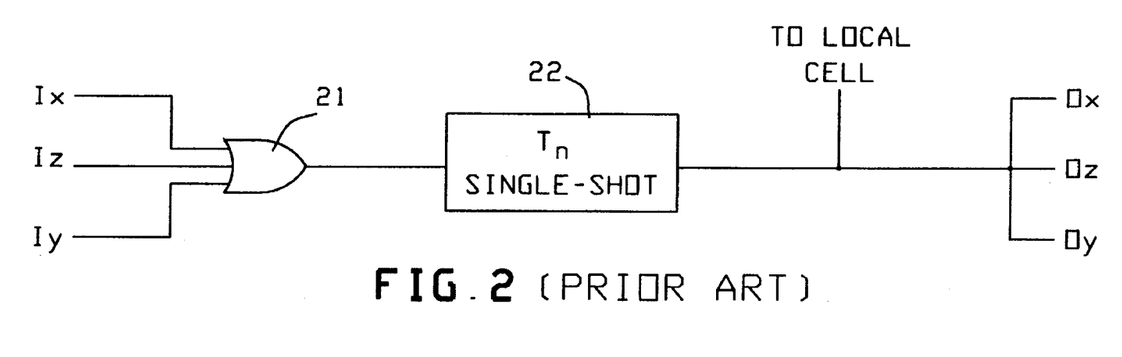
FIG. 2 shows the structure of a prior art singleshot-based clock node which may be used in the present invention.
Figure 3:
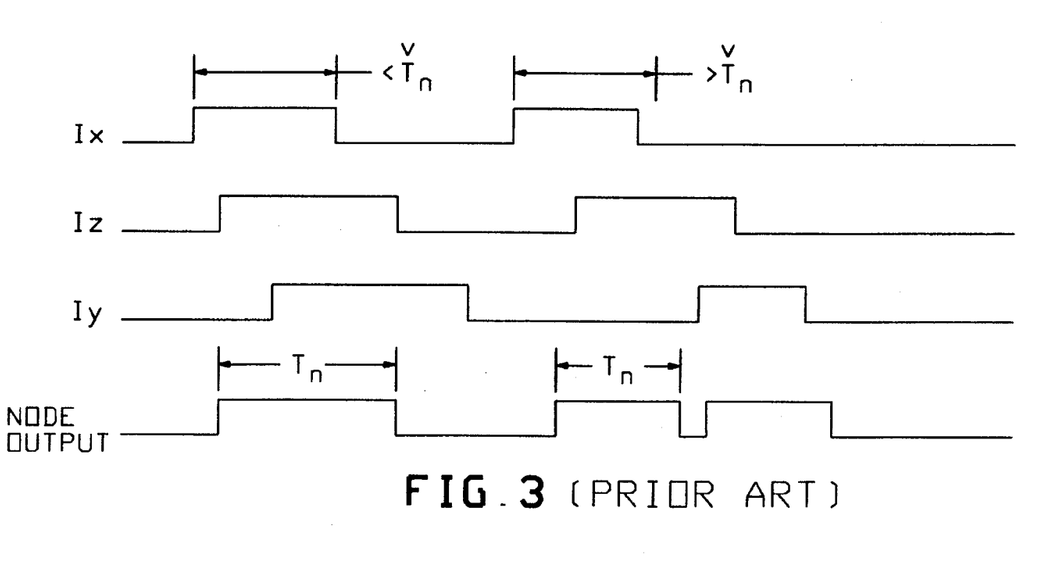
FIG. 3 is a waveform timing diagram showing prior art signals received by, and prior art signals generated by, the system of FIG. 2, and the relative alignment of those signals.

In the following analysis, the same node structure and terminology is used as in El-Amawy. Each node 14 and 16 OR's the incoming clock signals and triggers a non-retriggerable one-shot or single-shot that has a delay of half the clock period p. A prior art example of such a one-shot, and of waveforms for its input and output signals, are respectively shown in FIGS. 2 and 3. In the system of FIG. 2, the output of the one-shot or single-shot device 22 is itself delayed by a delay component 18 or 20 at the output of the node by a time $m\pm\epsilon$ that is about one clock period long. The node link delay $m\pm\epsilon$ in all figures (not shown) and for each of delay 18 and delay 20 (shown) can alternatively be provided by the backplane design and node spacing. The delay $g\pm\delta$ can here be the intrinsic delay of the clock node components in FIG. 2 or other implementation of the clock node. The value g is chosen as $g=p+\delta-m+\epsilon$ so that the value $\Delta$ (the time from the enabling pulse to the output clock pulse) is $\Delta=g+\delta+m+\epsilon=p+2(\delta+\epsilon)$. The value of $\Delta$ for FIG. 1 is preferably longer than the value of $\Delta$ for El-Amawy, because of the inserted delay. $\Delta$ for FIG. 1 is the delay through a node, delay and link. However, since $\Delta$ for FIG. 1 is close to one clock period p, the delay actually experienced by the system will appear to be shorter than that of El-Amawy. To analyze the behavior of the system 10 of FIG. 1, if the link containing delay 20 is temporarily disconnected from node 14 at point 26, then assuming that oscillator 12 provides a clock signal with an edge (rising or falling) at time 0, node 14 will produce a clock signal that arrives at node 16 at time c1 such that p is less than or equal to c1 which itself is less than or equal to $p+2(\delta+\epsilon)$. Similarly, node 16 would then produce a clock that arrives at its point of temporary disconnection 26 from node 14 at time c2 such that 2p is less than or equal to c2 which is itself less than or equal to $2p+4(\delta+\epsilon)$. Now if oscillator 12 is running such that it provides a pulse every period p, 2p, 3p, etc., then nodes 14 and 16 will also each provide pulses at the same time (within the above tolerances) after the first two clock periods. If the value 4 $(\delta+\epsilon)$ is less than p/2 then the line from node 16 disconnected at point 26 can then be connected to OR gate 21 of node 14 without altering the behavior of system 10, since such connection would not affect single-shot 22 of node 14. The value 4 $(\delta+\epsilon)$ can be made small, since it represents time tolerances, not actual delays. However, $\Delta$ should be greater than or equal to p, to prevent oscillation of system 10. A similar analysis can be used to determine the relationships for an n-node loop (where n=3, 4, 5, . . . ). In this case, the criterion for correct operation becomes 2n $(\delta+\epsilon)$ is less than or equal to p/2.

A simple design for a node is illustrated in FIG. 2. The inputs $I_x$, $I_y$ and $I_z$ are combined by the OR gate 21, whose output triggers the single-shot 22. Single-shot 22 sends a high output pulse to the cell and to outputs $O_x$, $O_y$ and $O_z$. The duration $T_h$ of the output pulse is selected within the bound specified by the timing constraints. Single-shot 22 is not retriggerable, and responds to a 0 to 1 transition at its input as long as this transition comes after a delay of at least $T_h+\lambda$ after the previous 0 to 1 transition at the input, where $\lambda$ is the setup time for the single-shot 22. However, there are many possible designs for the clock nodes. From a logic design viewpoint, a node is simply a device that responds to the first arriving effective transition, on any of its inputs, within each clock period. Specific designs will depend on network topology, which affects both the number of inputs and outputs, and the timing constraints imposed on the clock signals. Also, the design of a node will depend on the type of effective transition, that is 0 to 1 or 1 to 0. More than one node type may be included in the same network; networks with regular topologies and different cycle forms may be valid. Other node designs are illustrated in FIGS. 14–16 of the El-Amawy patent; also see column 12, line 21 through column 14, line 16 of the El-Amawy patent.

Figure 4:
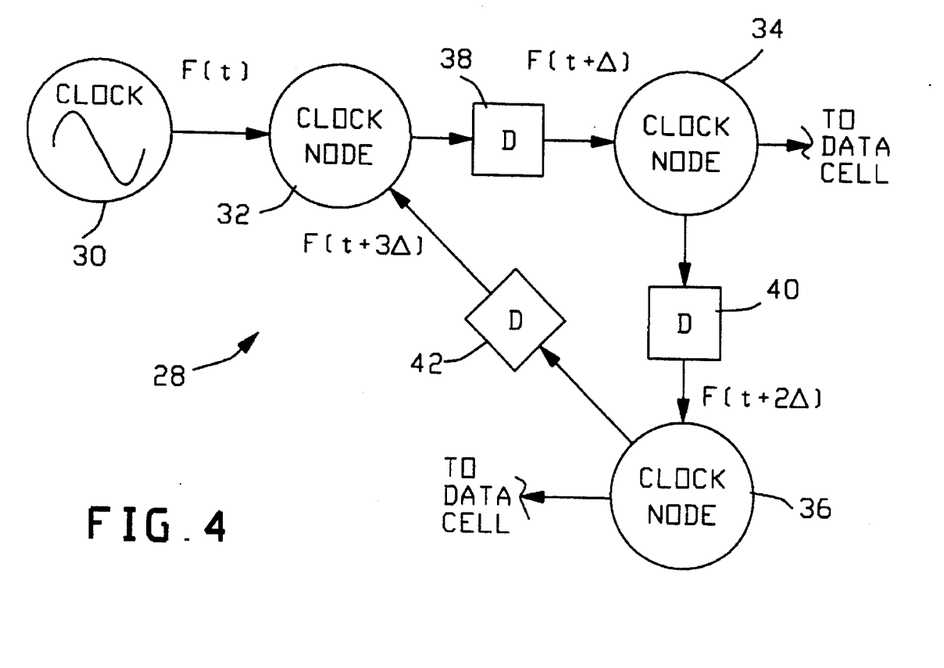
FIG. 4 shows an alternative embodiment of a clocking arrangement according to the present invention.

An alternative clocking system 28 is shown in FIG. 4. System 28 includes oscillator 30, node 32, node 34, node 36, delay 38 between node 32 and node 34, delay 40 between node 34 and node 36, and delay 42 between node 36 and node 32. Each delay 38, 40 and 42 imposes a delay $\Delta$ which is longer than that delay $\Delta$ proposed by El-Amawy, being just long enough to add one period p and compensate for the propagation time along a clock node and path, so that clock nodes or generators some distance away from the oscillator 30 are in phase. Suppose that a two-nanosecond delay line is utilized that provides a signal the same as its input but is delayed for 2 nanoseconds. If it is driven with a 500 MHz oscillator, then the input and output of the delay line will be the same, since the delay is equal to a full clock cycle. Now if a shorter delay is instead used, just long enough to compensate for the propagation time along a clock path, then the clock signal from node 32, 34 or 36 some distance away from oscillator 30 is also in phase. Thus, a clock signal is provided that has no inherent delay. FIG. 4 shows how this feature could be applied to a topology such as that employed by El-Amawy.

In both FIG. 1 and FIG. 4, each delay 18, 20, 38, 40 and 42 imposes a delay of $m\pm\epsilon$ seconds, so that the driven clock logic at each node emits a pulse at time $p+2(\delta+\epsilon)$, where $\delta$ and $\epsilon$ are tolerances in component values that can be made arbitrarily small in principle. For a clock line that is continually oscillating with period p, there is no practical difference between a signal transition at time t and a signal transition at time t+p. Thus, the clock skew may be reduced below the El-Amawy limit of $2\Delta$, so that the bounded skew approach becomes practical for faster logic.

In the present invention, the clock lines contain delays that delay the driven signals to align them with the driving clock signal. Feedback and clock combination logic are provided to bound the cumulative time errors. It is preferred that these delay values delay the clock pulses by one clock period, but it may delay them by two or more clock periods and still be operative. Alternatively, different delay values can be provided so that the clock signals of the system are delayed by different numbers of clock periods so that the self-oscillation modes are limited to the desired full-frequency mode.

FIGS. 5–16 illustrate different layered network fabrics or network switch fabrics in which the present invention can be employed.

FIGS. 5–11, 2 and 3 and Table 1 and (in part) their description below are adapted from FIGS. 1–6, 11, 13a and 13b and Table 1 and their description in the El-Amawy patent. The present invention can be utilized as an improvement to El-Amawy. However, for this application, each link in FIGS. 5–16 has included therein a delay of a preset value corresponding to m±ε. Such delays, as well as those of FIGS. 1 and 4, can for example be provided as shown in U.S. Pat. No. 5,272,729 issued Dec. 21, 1993 for "Clock Signal Latency Elimination Network" by Roland Bechade et al. That Bechade et al. patent is hereby incorporated by reference herein. However, any suitable delay can be used for this purpose.

Figure 5:
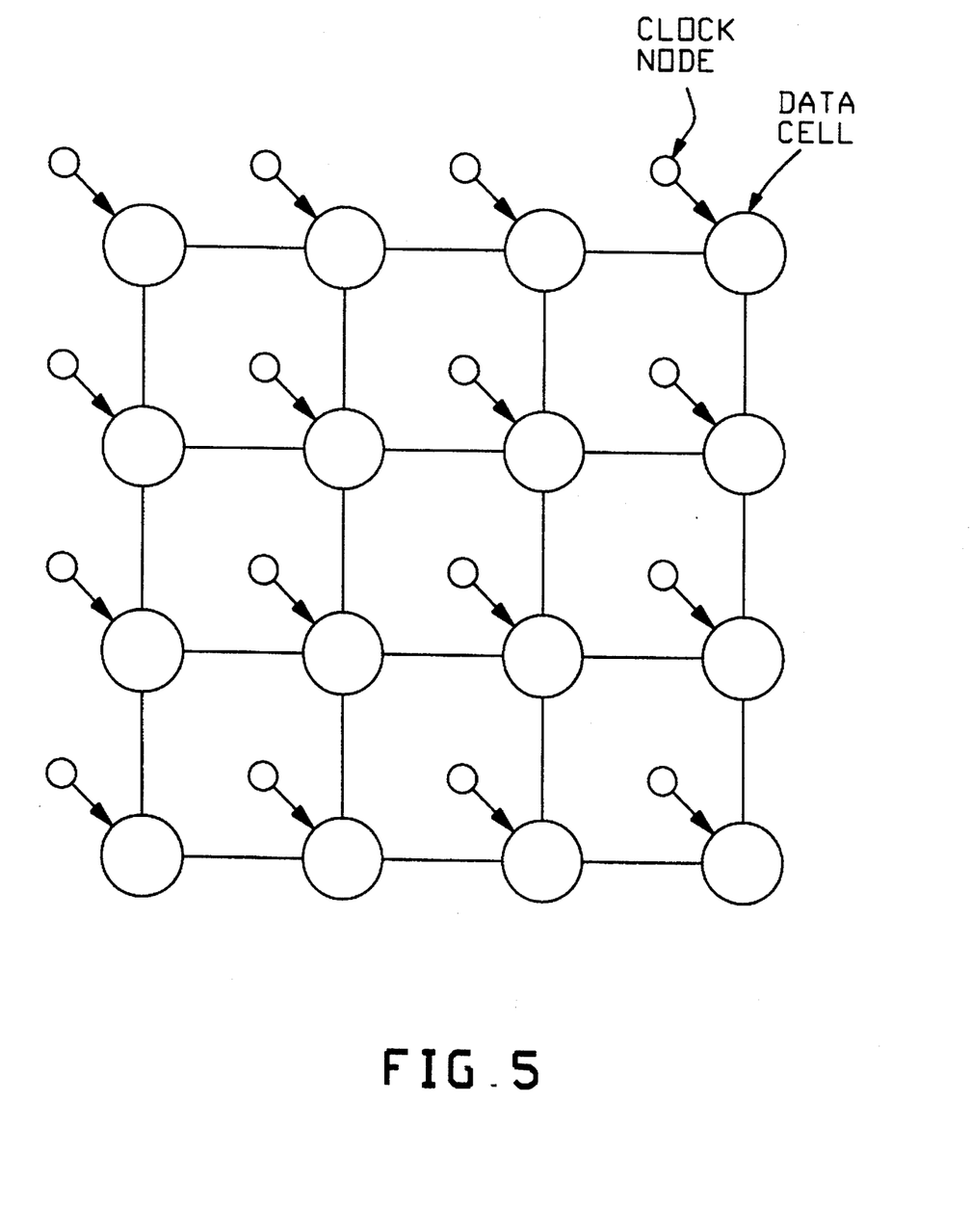
FIG. 5 shows generically a network of data cells and clock nodes, with one clock node associated with each data cell.
Figure 6:
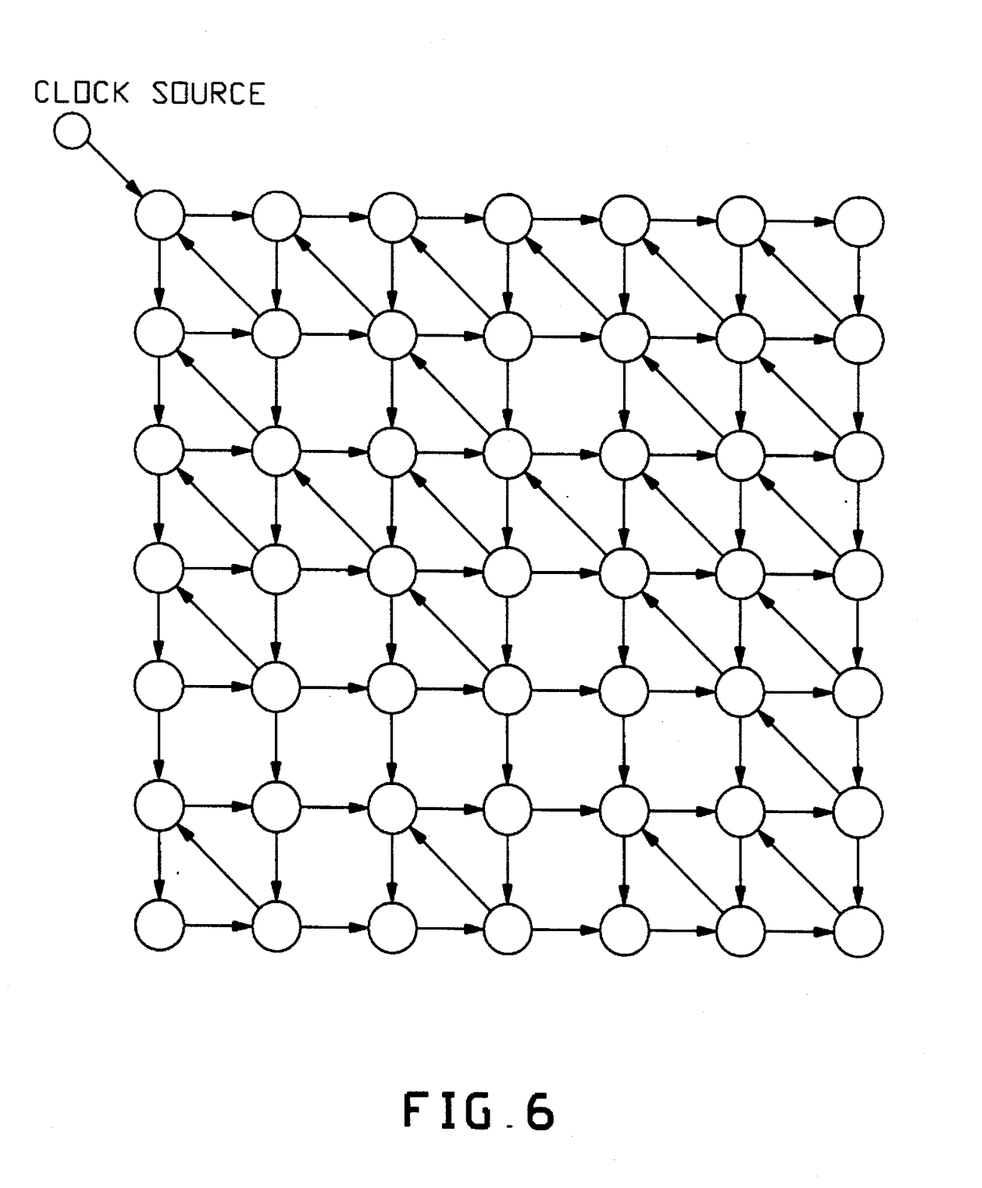
FIG. 6 shows an embodiment of a 2-dimensional, Direct Cycle Class (or DC-Class) clock network with F=3, such as can be practiced with the present invention.
Figure 7:
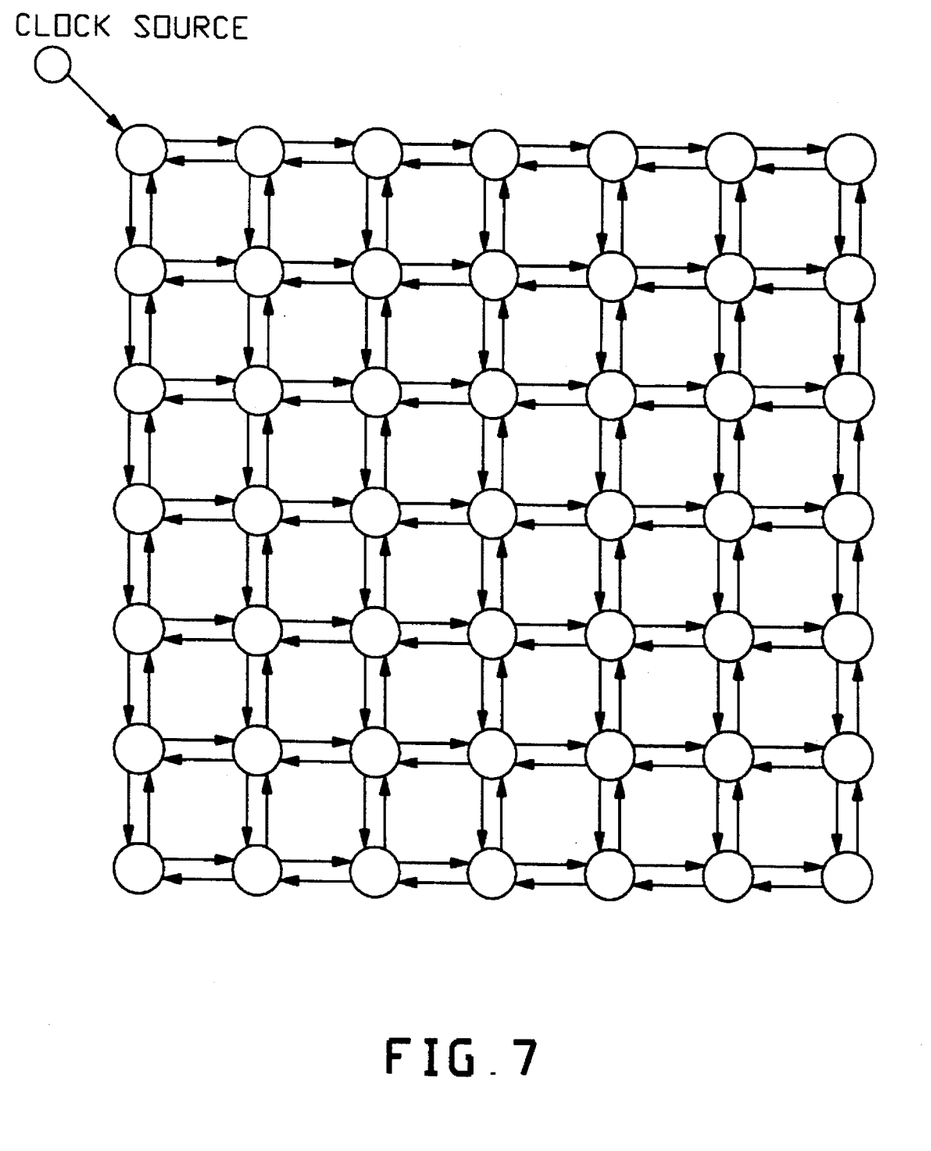
FIG. 7 shows an embodiment of a 2-dimensional, DC-Class clock network with F=4, such as can be practiced with the present invention.

There is shown in FIG. 5 an embodiment of a clock distribution network in which one clock node is associated with each data cell. Alternatively, each node could clock several data cells, and it is not necessary that the clock network be identical to the data cell network. A clock node creates a local reference for neighboring nodes, and processes the clock signal inputs to produce an output signal which adheres to the timing constraints. In general, each node will have at least two inputs. A clock node will respond to the first change of state that it receives at any of its inputs, and then ignores subsequent changes of state received during the time of one clock period. The duration of the high voltage part of the output signal produced by a clock node, or by the clock source feeding that clock node, must be longer than the maximum skew between any two inputs to that same clock node. The three 2-dimensional DC-Class network embodiments illustrated in FIGS. 6, 7 and 8 have different cost/performance characteristics. In FIG. 6, each interior node has degree 2; in FIG. 7, each interior node has degree 3; and in FIG. 8, each interior node has degree 4. Each network may be characterized by F which is the fan-in and fan-out of a node. In FIG. 6, each of the nodes are connected in a mesh fashion, such that each node is connected to six neighbors (except on the edges of the network) such that F=3. In FIG. 7, F=4, and any pair of nodes associated with a pair of communicating cells is included in a cycle of length 2. In the network topology of FIG. 8, F=2, and any pair of nodes associated with a pair of communicating cells is included in a cycle of length 4. The main parameters for each of FIGS. 6–8, and the tradeoffs between clock speed and skew bound versus the number of connections or wires, are summarized in Table 1 below.

TABLE 1

Figure 8:
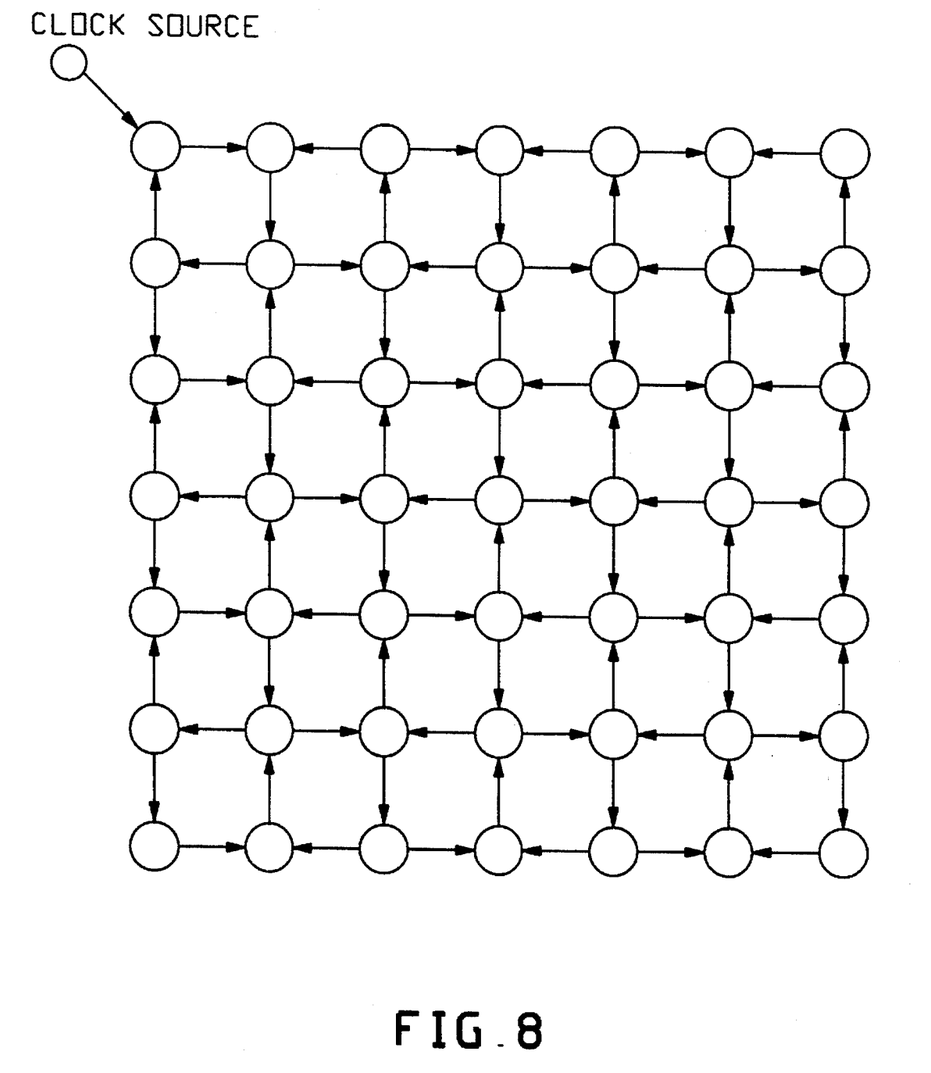
FIG. 8 shows an embodiment of a 2-dimensional, DC-Class clock network with F=2, such as can be practiced with the present invention.

| Network | Maximum Skew between communicating cells | Maximum Skew between any two inputs to a node | Minimum clock period |
| --- | --- | --- | --- |
| F = 2 | $3\Delta$ | $4\Delta$ | $8\Delta + \mu' + \lambda$ |
| F = 3 | $2\Delta$ | $3\Delta$ | $6\Delta + \mu' + \lambda$ |
| F = 4 | $\Delta$ | $2\Delta$ | $4\Delta + \mu' + \lambda$ |

The clock distribution network is cyclic in nature. In a Direct Cycle Class (or DC-Class) network, any two directly communicating cells must either be clocked by the same node, or by two nodes which are part of at least one cycle. A cycle is a closed, redirected path of nodes and links such that no node is repeated. For example, the networks of FIGS. 6, 7 and 8 contain many cycles.

Figure 9A:
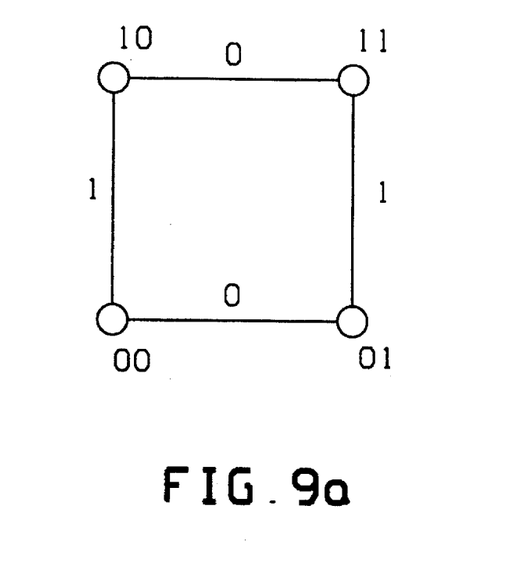
FIG. 9a shows a 2-dimensional hypercube.
Figure 9B:
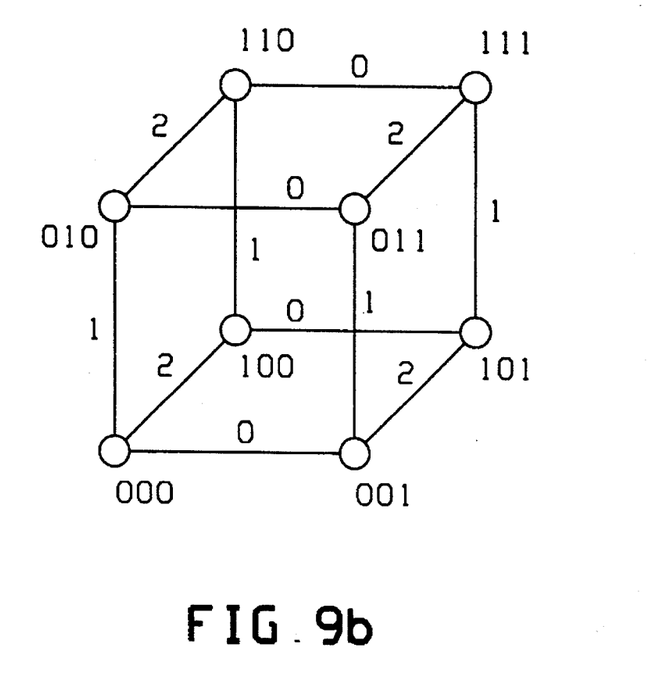
FIG. 9b shows a 3-dimensional hypercube.
Figure 9C:
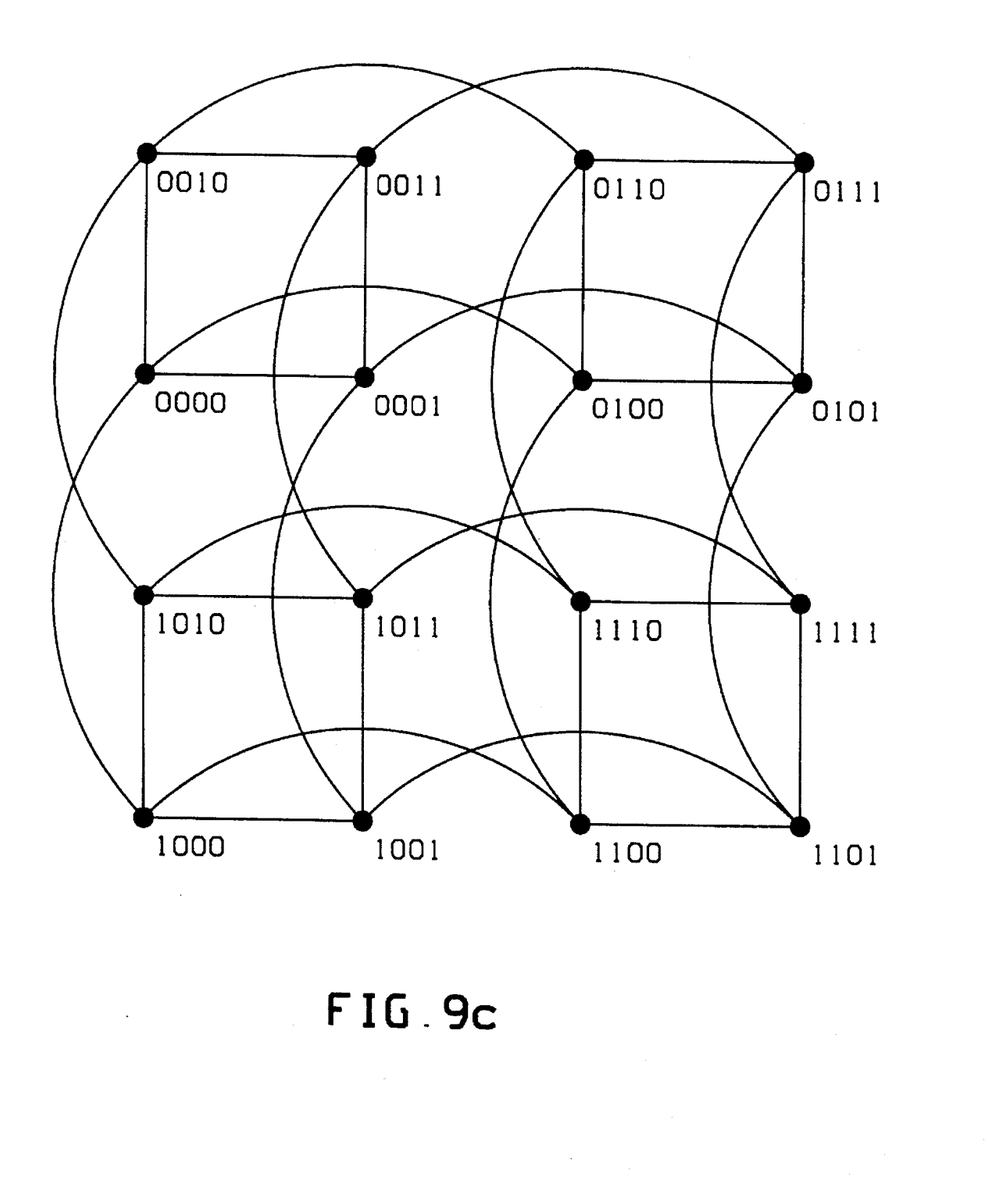
FIG. 9c shows a 4-dimensional hypercube.
Figure 10:
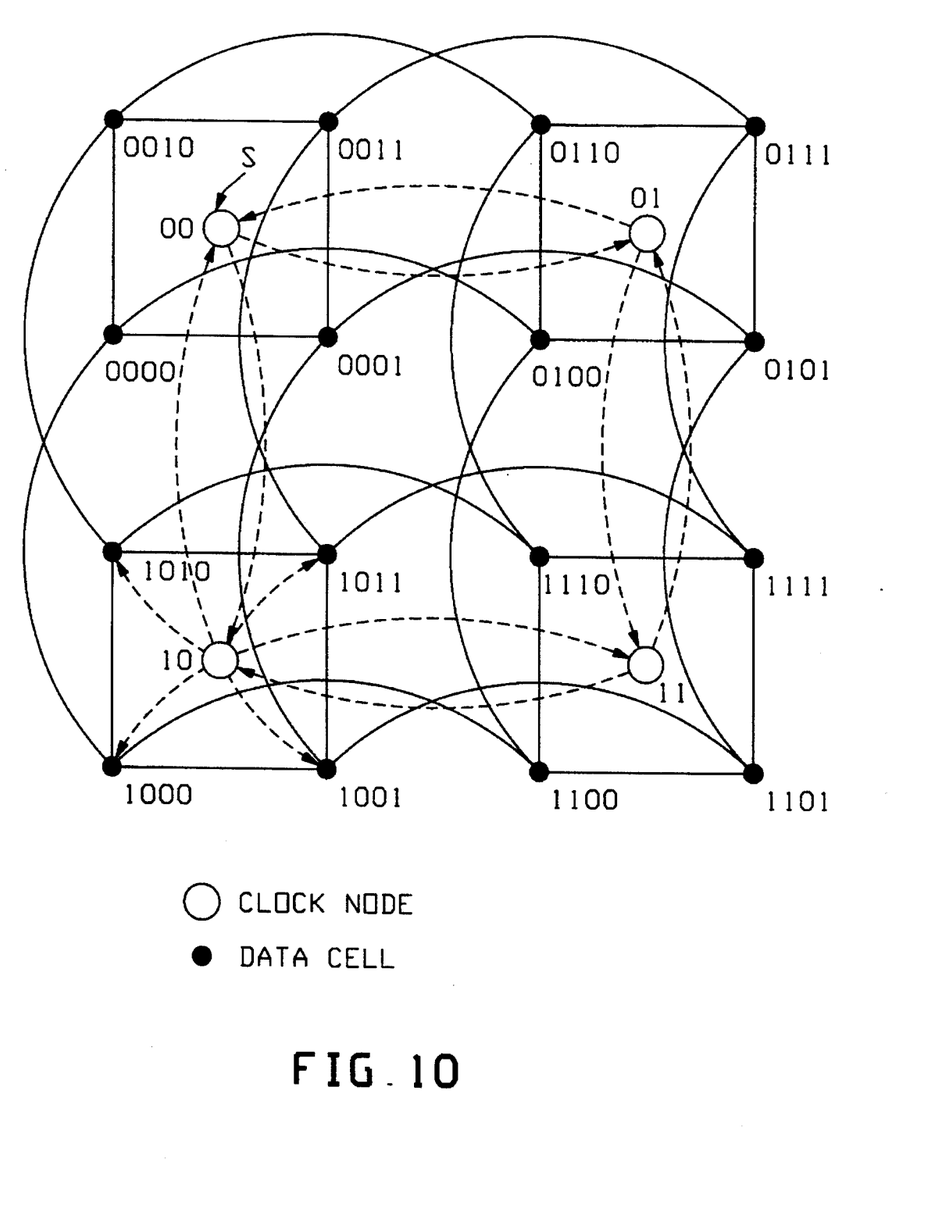
FIG. 10 shows an embodiment of a 4-dimensional, DC-Class clock network with F=2, such as can be practiced with the present invention.

In considering computing structures of arbitrary dimensionality and size, an n-dimensional hypercube (also known as an n-cube, binary cube, or Boolean cube) consists of $2^n$ cells labeled 0 through $2^n-1$. In such a hypercube, each cell is connected to exactly n neighbors, such that two cells are directly connected if and only if their binary labels differ in exactly one bit. FIG. 9a illustrates a 2-dimensional hypercube. FIG. 9b illustrates a 3-dimensional hypercube. FIG. 9c illustrates a 4-dimensional hypercube. An n-dimensional hypercube can be partitioned into $2^{n-k}$ subcubes of dimension k each, where k is less than or equal to n. Each such subcube would contain $2^k$ cells. Such partitioning into subcubes could be accomplished by considering the binary address of a cell as having two parts, with the part having the less significant bits representing the n-subcube label or address while the other part having the more significant bits represents the subcube label or address. If a single clock node is assigned to each subcube, and is given the same label as the associated subcube, then $2^{n-k}$ clock nodes labeled from 0 to $2^{n-k}-1$ would be provided. Two such clock nodes would be connected together in a 2-cycle (meaning that there is a link from each such node to the other such node) if and only if their labels differ in only one bit. The clock node associated with a subcube is responsible for clocking all of the nodes in that subcube. The network containing the clock nodes is itself an (n–k) hypercube. FIG. 10 illustrates a 4-cube partitioned into 4 subcubes of dimension 2, and the connections among the clock nodes. FIG. 10 also illustrates clock distribution within subcube 10, which contains nodes 1000, 1001, 1010 and 1011.

Figure 11:
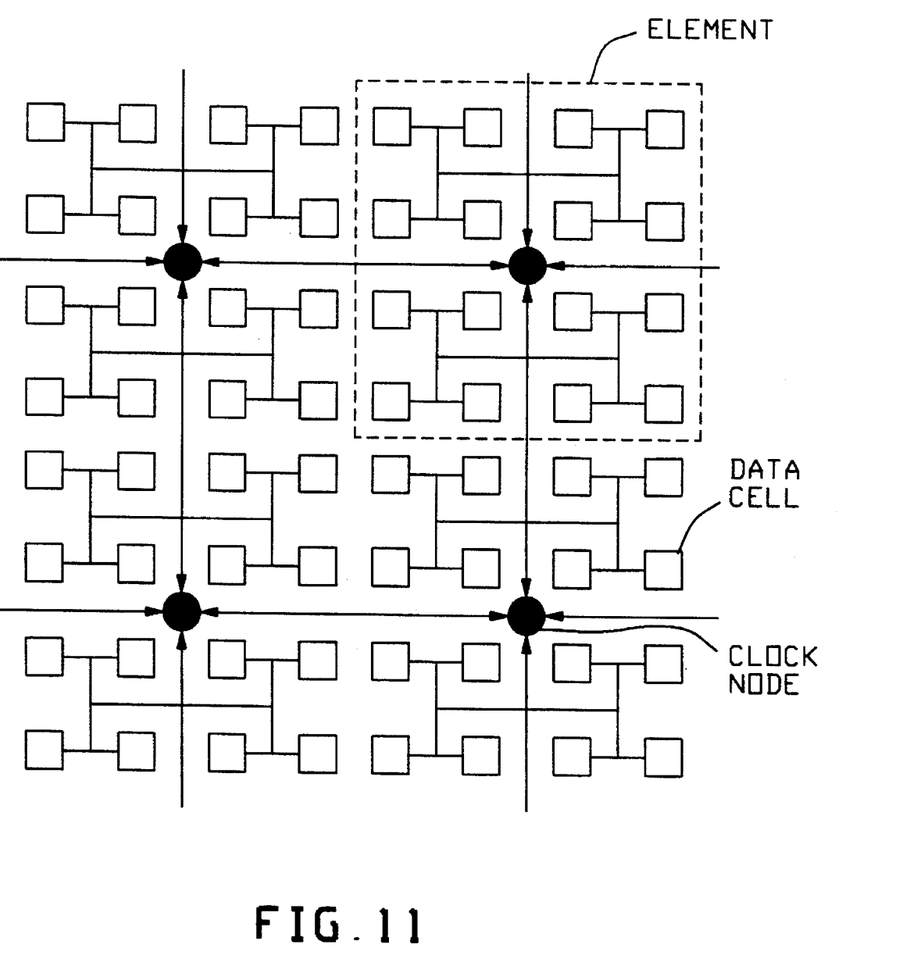
FIG. 11 shows a hybrid clocking system in which each clock node clocks several data cells, such as can be practiced with the present invention.
Figure 12:
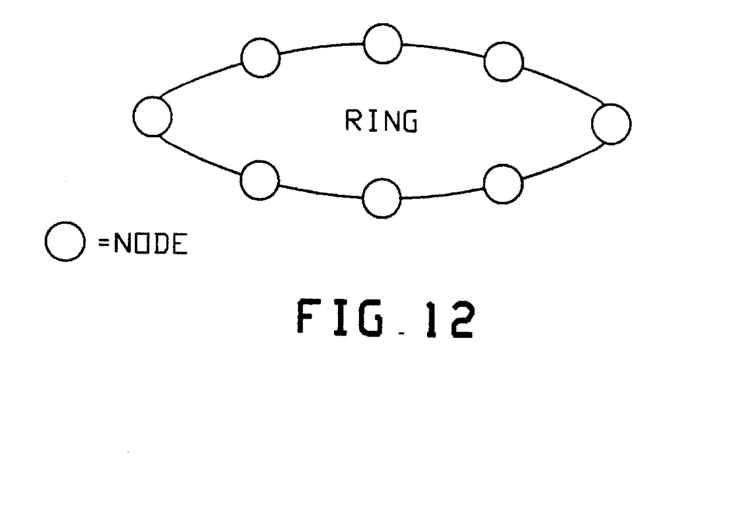
FIG. 12 shows a ring arrangement of nodes such as can be practiced with the present invention.
Figure 13:
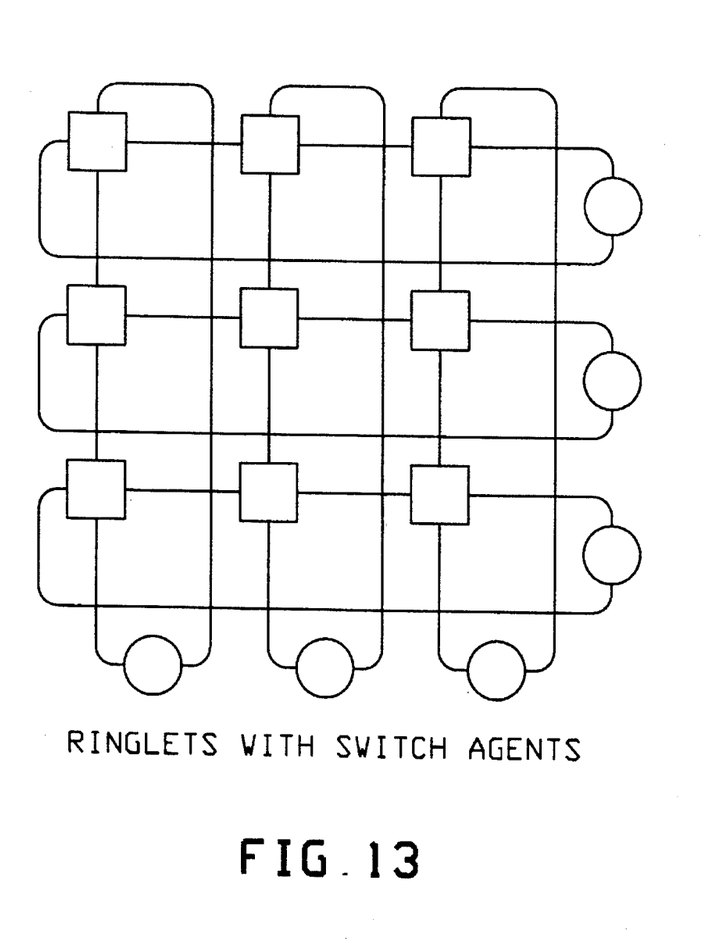
FIG. 13 shows an arrangement of nodes in ringlets with switch agents such as can be practiced with the present invention.
Figure 14:
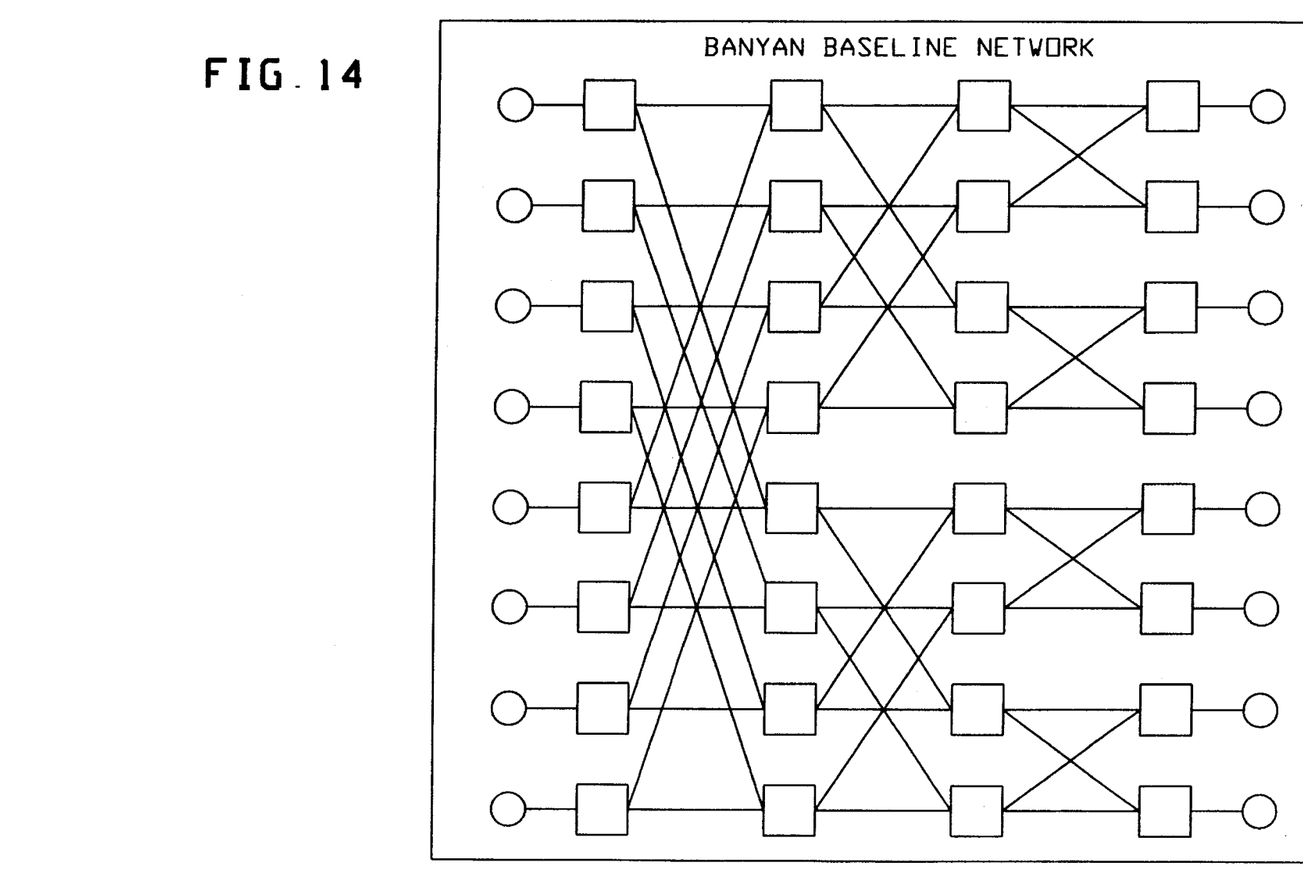
FIG. 14 shows a banyan baseline network such as can be practiced with the present invention.
Figure 15:
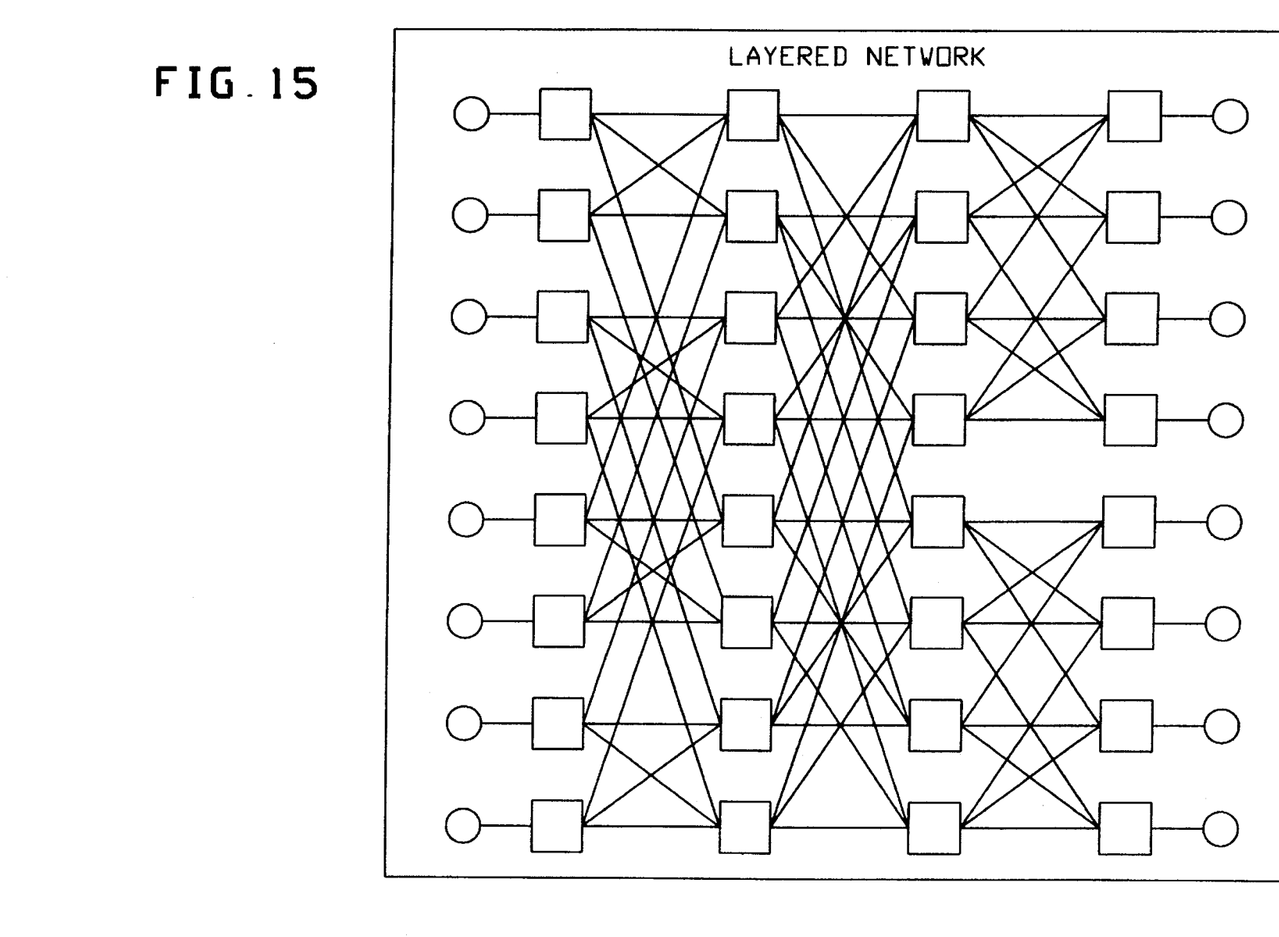
FIG. 15 shows a layered network such as can be practiced with the present invention.
Figure 16:
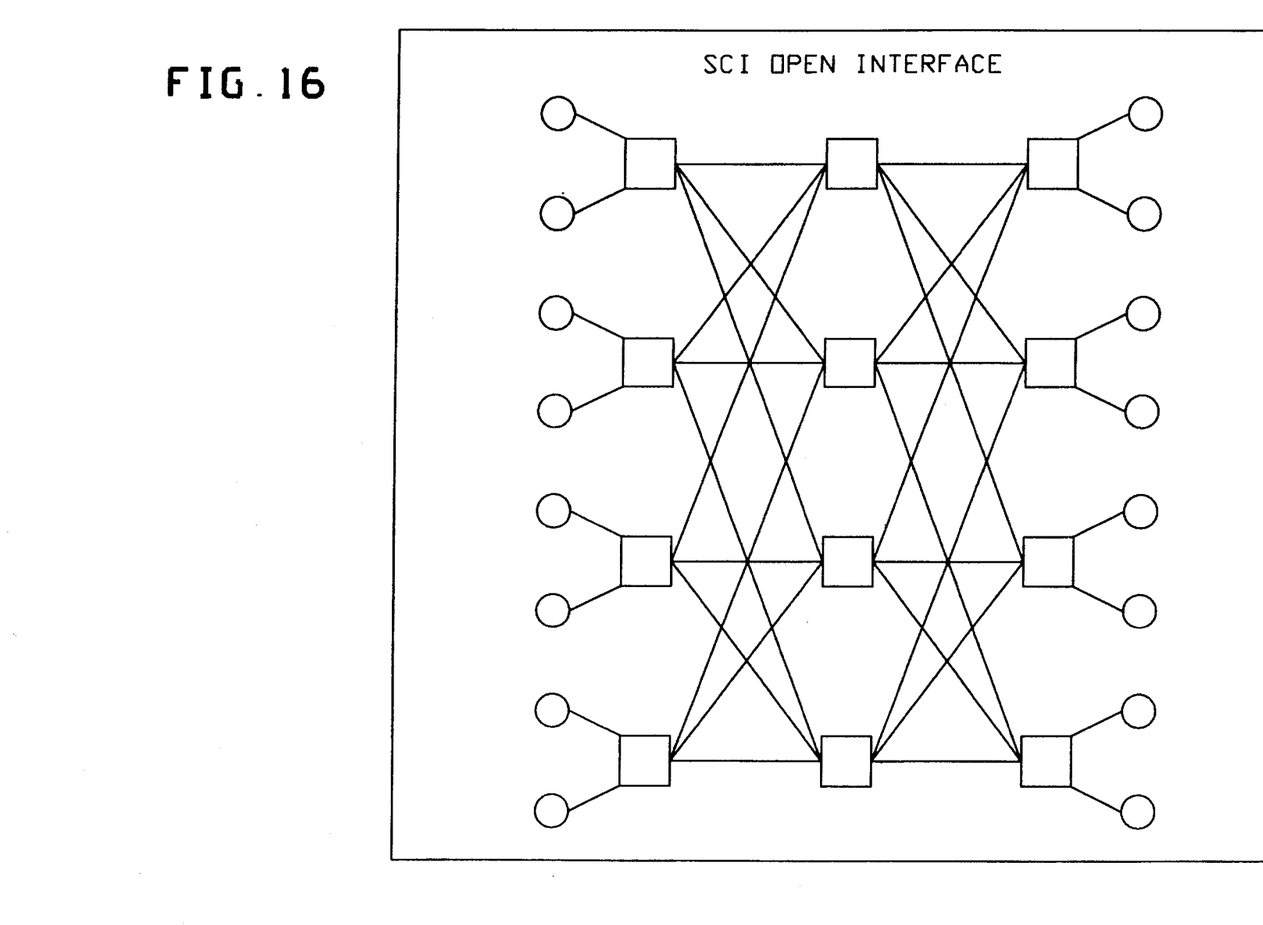
FIG. 16 shows an SCI open interface such as can be practiced with the present invention.

In FIG. 11, several cells are clocked by one node, so that it is now permissible to clock two directly communicating cells from the same node.

In FIGS. 12–16, each circle represents a node, and each square represents a switch or switch agent. In FIGS. 12–16, each undirected line, edge, arc, etc. represents a pair of oppositely directed links, so that there are two oppositely directed links between each pair of nodes, such as is shown in FIG. 7.

In the present invention, a number of at least substantially identical parallel delays are inserted in the system, of a preset value, to get the clocks' respective phases to align with each other more accurately; each of the nodes gets delayed by one clock cycle, so that the clocks' outputs are all in phase.

Some of the many advantages of the invention should now be readily apparent. For example, novel apparatus and method have been provided for limiting clock skew. Accurate clock signals are provided for a large amount of digital logic. A delay line is used to delay a propagating clock signal by just enough time to cause the repeated clock to occur at the right time in the next cycle. The bounded skew is reduced to an arbitrarily small value, depending upon the user's need and desire to control various tolerances. An upper bound is imposed on the skew between physically separate clocks to limit them to the error tolerances of the implementing components. The present invention can be employed as an improvement on the system of El-Amawy, as described in the El-Amawy patent and the El-Amawy article and more particularly shown in the clock networks illustrated in FIGS. 5 to 15. The networks shown in FIGS. 5 to 11 are also shown by El-Amawy, however, the the arrangements and networks shown in FIGS. 12 to 16 further expand the intended use of the present invention.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise as specifically described.

What is claimed is:

1. Apparatus for distributed clocking, comprising:
a clock generator for generating a periodic clock edge signal of period p,
a plurality of clock nodes, each said clock node being at least connected to another of said clock nodes via a link connection or to said clock generator,
each of said clock nodes having a logic delay $g\pm\delta$,
a plurality of link delays one in each said link connection between a pair of nodes, and
each of said link delays having a delay value $m\pm"$ chosen such that the output of each said clock node occurs shortly after a clock edge signal p such that the loop transmission delay $2n(\delta\pm\epsilon)$ is less than or equal to p/2 where n is the number of nodes connected in a loop and $\delta$ and $\epsilon$ are small device delay tolerances and m is a delay value,
whereby said clock edges originating from said clock generator are regenerated at each output of said clock nodes in synchronism with each other.

2. Apparatus as defined in claim 1 wherein:
the delay values being chosen such that the transmission delay from the output of one clock node to another is equal to $g+\delta+m+\epsilon$.

3. A method for distributing clock signals to a plurality of clock nodes in a system, comprising the steps of:
providing each clock node with at least one link connection to another node or to a clock source;
providing each link connection between clock nodes with a fixed link delay such that the total delay between any two clock nodes is equal to one or more clock periods p of the clock source plus a device tolerance value that is less than half one clock period p, so that the loop transmission delay $2n (\delta\pm")$ is equal to or less than p/2 where n is the number of nodes connected in a loop and $\delta$ and $\epsilon$ are small device tolerances;
providing a clock signal from the clock source to at least one of said clock nodes; and
providing an input clock signal to each of the other clock nodes from a link delay such that the clock signal at any one clock node is synchronized with the output signal from all other clock nodes.

4. Apparatus for distributing clock signals in an asynchronous complex high speed electronic data system so that data circuits are synchronized with a source of clock signals, comprising:
a source of periodic high speed clock signals having repetitive cycle times p,
a plurality of high speed data circuits to be enabled by said clock signals at points remote one from another,
a plurality of clock nodes for regenerating said clock signals, at least one clock node being located on or near each said data circuit,
at least one of said clock nodes having a direct connection to said source of high speed clock signals,
the others of said clock nodes being connected to another of said clock nodes via a link connection,
said clock nodes comprising high speed logic circuits having a logic delay of $g+\delta$ where $\delta$ is a tolerance value and g is the logic circuit delay;
link delays in said link connections having delay value equal to $m+\epsilon$ wherein $\epsilon$ is a tolerance value and m is a delay value chosen such that the output of each of said clock node occurs substantially simultaneously with the occurrence of one of said repetitive cycle times,
the delay $g+\delta+m+\epsilon$ being substantially equal to the cycle time p,
the loop transmission delay $2n(\delta+\epsilon)$ being equal to or less than one-half the cycle time p/2 where n is the number of clock nodes in the loop and
the output of selective one of said clock nodes being coupled to inputs of said high speed data circuits so that all data circuits in said data system are synchronized with said source of high speed clock signals.

5. Apparatus as set forth in claim 4 wherein $\delta$ and $\epsilon$ are controllable small device tolerances compared to the values of g and m.

6. Apparatus as set forth in claim 5 wherein a plurality of clock nodes are coupled together before being connecting to a high speed data circuit, and
the loop delay at the output of the nth clock node is equal to or less than $2n(\delta+\epsilon)$ where n is the number of clock nodes in the loop.

* * * * *